Aug. 8, 1933.  A. D. MacLEAN ET AL  1,921,366
LIQUID SEAL DEVICE FOR REGULATORS
Filed Dec. 13, 1930
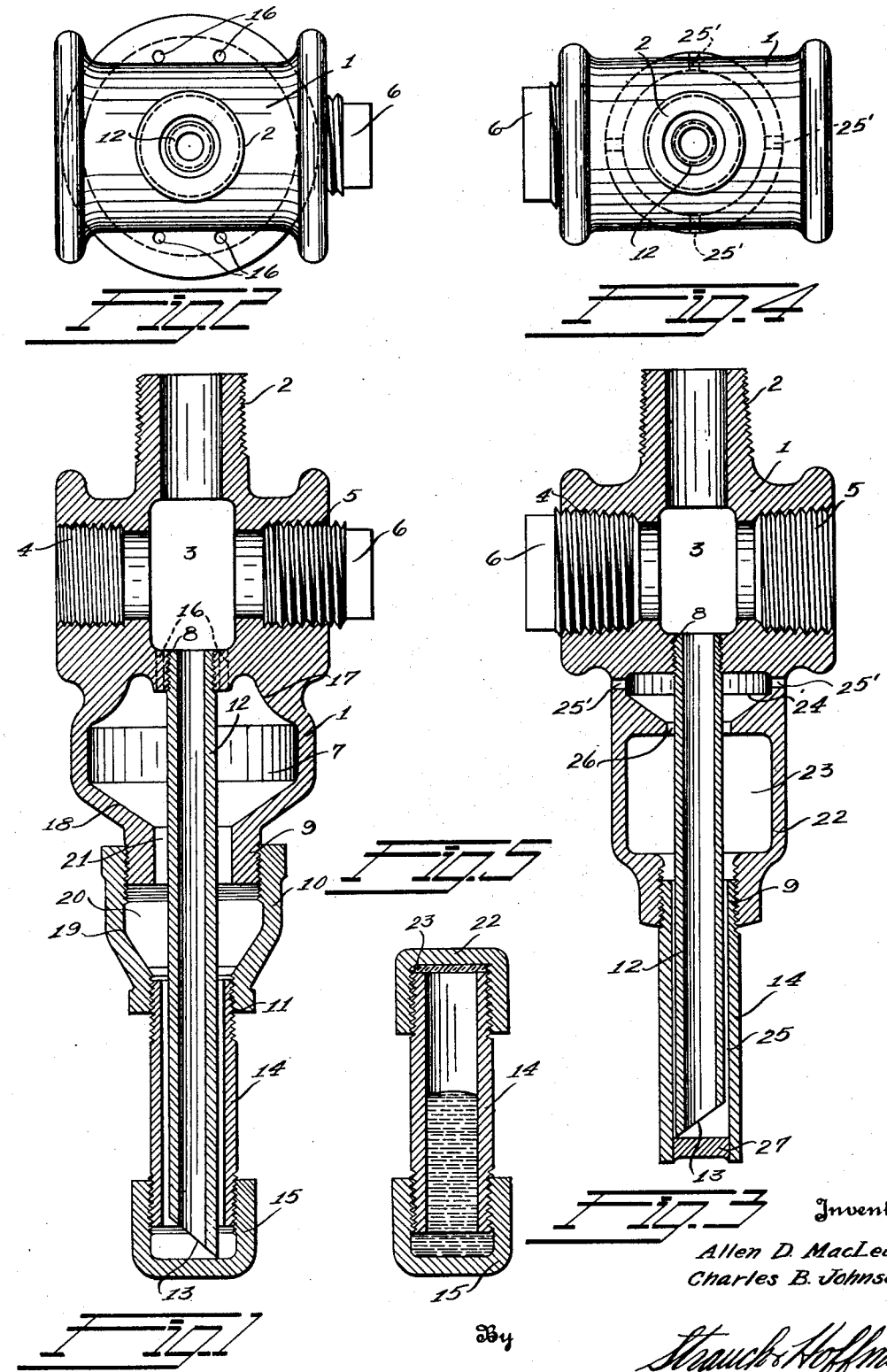
Inventor
Allen D. MacLean
Charles B. Johnson
By Strauch & Hoffman
Attorneys Patented Aug. 8, 1933

1,921,366

UNITED STATES PATENT OFFICE 1,921,366

LIQUID SEAL DEVICE FOR REGULATORS

Allen D. MacLean and Charles B. Johnson, Pittsburgh, Pa., assignors to Pittsburgh Equitable Meter Company, Pittsburgh, Pa., a Corporation of Pennsylvania Application December 13, 1930
Serial No. 502,200

7 Claims. (Cl. 137—53)

This invention relates to a liquid sealing device, and particularly to a liquid seal for use with gas regulators, although not limited to such use, and is a continuation in part of our earlier application, Serial Number 411,097 filed December 2, 1929 and entitled "Liquid seal device for regulators". It discloses certain modifications and improvements of the device as described in that application. The invention as herein disclosed shows further embodiments and improved modifications of the invention and provides constructions in which the possibility of loss of the sealing liquid during the relief of excessive pressures is still further reduced.

In fluid distribution where flow controlling devices as pressure regulators and meters are employed it is usually necessary to provide safety devices to afford relief in the case of excessive pressures. Liquid seals as constructed prior to our invention have been so constructed that when a blow off occurred, considerable of the sealing liquid was blown off and lost. This required the frequent replacement of the lost liquid in order to maintain the seal in accurate and complete working operation. We have provided improved constructions in which the sealing liquid when blown out is collected and prevented from being expelled from the seal device.

In prior liquid seals it has been customary to pour in the sealing liquid, as for example mercury, on the job, when the seal is installed and after some of the sealing liquid has been blown out and lost, thus decreasing the effectiveness and accuracy of the seal. This necessitates the mechanic following instructions regarding the quantity of liquid to be poured in with great care, since if an incorrect quantity is poured in in changing the seal the device is rendered inaccurate and insensitive to the gas pressure. Human error enters into the process and an accurate, sensitive and proper functioning of the seal cannot in all cases be obtained.

It is a further object of our invention to provide a liquid seal in which a shipping cartridge or container is used. Such container is supplied with the exact quantity of sealing liquid required. This cartridge or container is shipped out to the installation and is adapted to be readily inserted and removed so that a correctly sensitive seal is certain to be obtained.

Another object of our present invention is to provide a construction such that when the excessive pressure is once relieved, the seal automatically resets itself without manual attention of any sort.

A further object of our invention is to provide combined outlet connections and liquid seals for the low pressure side of a gas regulator, adapted to conveniently control a supply of gas to one or more low pressure pipes from a common high pressure source.

We have provided a liquid seal that is inexpensive, easy to install, sensitive and readily responsive to the gas pressure and yet is extremely durable in construction.

These and further objects will be apparent from the following description and from the scope of the appended claims when taken in connection with the accompanying drawing wherein:

Figure 1 is a longitudinal section of one form of complete seal embodying our invention.

Figure 2 is a top view of the seal shown in Figure 1.

Figure 3 is a longitudinal section of a slightly modified form of our seal.

Figure 4 is a top view of the seal shown in Figure 3.

Figure 5 is a sectional view of the shipping cartridge provided for attachment to our improved seal.

Referring to the drawing and particularly to Figure 1, a preferred embodiment of our improved seal includes a body portion 1 having a threaded nipple 2, thereon, for detachable association with a gas regulator or other device requiring a liquid seal. The body portion 1, as shown, includes a hollow central casing 3 with internally threaded branches 4 and 5 radiating therefrom. These branches 4 and 5 are adapted for connection to the low pressure mains protected by the pressure regulator as shown, there are only two passages 4 and 5 for connection to low pressure mains, but obviously the invention is not limited to two mains and three or four mains could be associated with the body portion 1. When only one pressure main is to be serviced, the remaining openings 4 and 5 are closed by pipe plugs 6, which block off the unused connections.

The body portion 1 has integrally formed therewith a depending chamber 7 which communicates with the central chamber 3 by a threaded bore 8. The lower portion of chamber 7 is contracted and has a threaded bore 9 formed thereon. Upon this threaded portion 9 is screwed the lower sleeve portion 10 which is itself formed with an internally threaded bore portion 11. This threaded bore portion 8 of the depending chamber 7 is adapted to receive the upper end of elongated pipe 12 which is screwed into the bore. This pipe passes freely through the opening in lower threaded portion 9 of the chamber 7 and freely through threaded bore portion 11 of the sleeve 10. Pipe 12 is open at its lower end and is cut at the lower end at an acute angle to its direction of length as shown at 13 so that some points on the annular end surface 13 of the pipe are further from the upper annular end surface of the pipe, than others. The purpose of this construction will be described later.

Pipe 12 is surrounded by a second conduit or pipe 14 of larger diameter than pipe 12 and this pipe has threads formed thereon and is adapted to be screwed into bore portion 11 of sleeve 10. Since this pipe is larger in diameter than pipe 12 an annular space is provided between the pipes when the seal is assembled the purpose of which will be described hereinafter. The lower end of pipe 14 is closed by a cap 15 which is screw-threadedly engaged thereon and preferably welded in place.

As seen from Figures 1 and 2 the chamber 7 is provided with a plurality of vent holes 16 to provide for the escaping of the gas out of the seal to the outside atmosphere. The sides of chamber 7 are formed of an upper curved wall 17 and a lower curved wall 18. It will be noted that sleeve 10 provides, because of its flowing sides 19, a cavity or chamber 20 which communicates with chamber 7, only through the narrow bore 21 in the member 7. Thus communicating opening 21 forms a constricted opening between the two chambers.

Pipe 14 may be readily detached from the remaining portions of the seal by merely unscrewing it from the bore 11, and is used as a shipping cartridge or container for the desired quantity of liquid, usually mercury, as shown in Figure 5. The pipe is filled with the correct quantity of sealing liquid at the factory, and is closed by a removable cap 22 in which a leather or rubber washer 23 may be interposed if found desirable. Thus the mercury or other sealing liquid is securely retained within the pipe during shipment. When so used the correct quantity of liquid may be inserted at the factory and shipped to the installation without danger of the loss of any of the liquid. When the device is installed for service the desired quantity of liquid is already in the seal and it is not necessary for the mechanic to pour out any measured quantity of liquid.

The immense practical utility of this shipping cartridge containing the exact quantity of sealing fluid for sensitive and accurate operation will be readily appreciated, for should any of the sealing liquid be lost all that is necessary is for the user to have an extra cartridge on hand and insert it, since the cartridges are all interchangeable. The householder may be provided with one or more service cartridges, such as shown in Figure 5, with simple instructions to close the valve leading to the low pressure main, remove the old cartridge 14 and insert a fresh cartridge whenever the liquid therein has become lost for any reason.

The design of chambers 7 and 20 is such that possibility of loss of the sealing liquid, usually mercury, is eliminated almost entirely in the event of an excessive pressure on the low pressure main. The liquid is forced down by the excess pressure from chamber 3 forcing the liquid upwardly in the annular space between pipes 12 and 14, throwing this liquid upwardly into chamber 20. Before the liquid can find its way into chamber 7 it must pass through constricted opening 21 and thus will be done only with considerable difficulty as the narrow channel acts as a baffle to free passage of the fluid. After it finds its way into chamber 7 it is deflected by the baffling side walls 17 and 18 and the possibility of the escape of the sealing liquid out of the device through vents 16, which vents are disposed substantially laterally of the restricted passage 21 so that liquid thrown violently through said restriction against the portion of the wall 17 directly thereabove will not be thrown through said vents. Loss of liquid is thus prevented. Ample space in the chamber 18 is provided for the reception of the liquid while the pressure of the gas is being relieved by flow thereof through restriction 21 and vent 16. When the excessive pressure has been relieved the mercury or other sealing liquid will flow back through opening 21 and annular space between pipes 12 and 14 and will automatically reset the seal for future operation.

In the modification shown in Figures 3 and 4, the two castings 7 and 10 are replaced by a single member. This member is formed at the upper portion with internally threaded branches 4 and 5 as in the first described modification and includes the same hollow central casing 3. A plug 6 is also shown closing one of the threaded branches. A lower threaded bore 9 is also formed on this unitary member. The hollow central chamber 3 communicates with another chamber 24 formed in the casing by means of a threaded bore 8. The pipe 12 is screwed into the threaded bore 8 and extends through chambers 24 and 23 and through threaded bore 9 on the member 22. Pipe 14 of larger diameter than pipe 12 surrounds pipe 12 as in the first described modification and this pipe is securely screwed into the threaded bore 9 on casting 22. The differences in the pipe diameters provide an annular space 25 between the pipe members. The lower end of pipe 12 is cut at an acute angle to the direction of its length, as shown at 13, the same as in the previously described form. The casting 22 is provided with a plurality of holes or vents 25' leading from chamber 24 to the outside atmosphere. The chambers 23 and 24 formed in the casting 22 are in communication through a narrow constricted opening 26 through which pipe 12 passes, leaving an annular opening surrounding this pipe. The lower end of pipe 14 is closed by a plug 27 preferably welded in place, and this pipe may be closed at its upper end and used as a shipping cartridge as the pipe shown in the first described modification and illustrated at Figure 5. As in that modification the sealing liquid when blown upward by an excessive pressure on the low pressure main, will travel upwardly through chamber 23 and in order to get to chamber 24 will have to pass through the constricted annular opening 26. The narrowness of this opening will retard the force movement of the sealing liquid and in this way loss of the liquid through the openings 25 is prevented. The gas under the excessive pressure passes out through openings 25 into the outer atmosphere.

It is believed that the operation of the device will be obvious from the above description. Due to pressure within the pipe 12 the liquid contained therein will be forced downwardly out of the open lower end thereof, and up into the annular space between the pipes 12 and 14. If excessive pressure occurs the liquid is blown upwardly through the annular space between pipes 12 and 14 and thence into the chamber 20 in the first modification, or the chamber 23 in the second modification. Further movement of the liquid is considerably hampered by the restricted portions 21 or 26. The gas meanwhile passes up through constricted opening 21 or 26 into chamber 7 or 24 and thence out into the outer atmosphere through apertures 16 or 25. Should any of the sealing liquid find its way into chamber 7 it is deflected by baffling side walls 17 directly in its path and thus further prevented from being dispelled through the laterally disposed apertures 16 as above stated. In the modification of Figure 3, it will be noted that the wall directly above the restriction 26 is imperforate and that the vents 25' extend in a direction transverse to the direction in which the liquid that passes restriction 26 is blown. The course of said liquid is checked and said liquid drops upon the inclined surface leading toward restriction 26 as illustrated. When the excessive pressure has been relieved the sealing liquid flows back through annular openings 21 or 26 into the annular space between pipes 12 and 14 and so automatically resets the seal.

The cutting of the lower end of pipe 12 on an angle other than a right angle to the longitudinal axis of the pipe has the advantage that when the outer shipping cartridge formed of pipe 14, which contains the sealing liquid is screwed into threaded bore 11 or 9, its movement is limited by the lower sharp edge of pipe 12, as shown in Figures 1 and 3. That is when cap 15 or 27 bears up against the lowermost edge of pipe 12, the positioning of pipe 14 is accurately determined. Thus when a new shipping cartridge is sent out to the installation, all that is necessary for the workman to do to accurately and correctly set the seal, is to insert the shipping cartridge pipe 14, after removal of the cap 21, until it will not go in any further by reason of abutment against lowermost edge of pipe 12. It is then assured that the mercury shall stand at exactly the same height in the annular space between pipes 12 and 14 at all times, since the cartridge is shipped out always containing the same and correct quantity of the sealing fluid. In addition this construction of the lower end of pipe 12 insures that there is no dead or waste space between the lower end of pipe 12 and the cap or closure for the lower end of pipe 14. This space would necessitate the use of a greater quantity of mercury than necessary and by this construction this is avoided.

The distinctly practical and novel advantages presented in our invention as herein disclosed will be apparent. The seal is one in which the loss of the sealing fluid in the event of an excessive pressure or blowoff is greatly minimized by the chamber construction, if not entirely prevented. In addition when a blowoff has occurred, the seal automatically resets itself since the sealing fluid flows back into sealing position again. The shipping cartridge provision, which entirely eliminates the necessity for the installation mechanic measuring or pouring the fluid on the job is an important and novel advantage, since it insures the correct amount of fluid for accurate operation at all times. In addition should any of this fluid become lost through inadvertence or breakage, it is a simple step to replace the pipe 14 by a similar cartridge unit. A unit may thus be kept on hand for such emergencies. The novel construction of lower end of the pipe 12 insures a minimum quantity of the sealing fluid, which is usually an expensive liquid such as mercury, since there is no waste or dead space in the cap. In addition the end construction of pipe 12 provides for the easy and accurate positioning of cartridge 14 in the threaded bore and in the seal for correct operation.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What we claim as new and desire to secure by United States Letters Patent is:

1. In a liquid seal for fluid pressure regulators or the like, a pair of conduits forming therebetween a longitudinally extending annular channel for the sealing liquid, a body member formed with vent holes for the escape of the fluid under predetermined conditions and with two chambers for the reception of sealing fluid expelled under those conditions, the said chambers having means whereby escape of the sealing liquid through the vent holes is positively prevented, one of said conduits passing through both chambers and forming a constricted opening around the conduit and between said chambers.

2. The construction claimed in claim 1 wherein the means for the prevention of the escape of the sealing liquid comprises a boss formed in said body member.

3. The construction claimed in claim 1 wherein the means for the prevention of the escape of the sealing liquid comprises a perforated baffle member through which said last mentioned conduit extends, and which provides an inclined surface to deflect the sealing liquid downwardly toward the annular channel.

4. A liquid seal device for pressure regulators or the like comprising a hollow body member; an apertured baffle member provided within said body member and dividing the latter into upper and lower chambers; a pipe extending through said chambers and cooperating with said baffle member to provide a constricted passage, said pipe having an open lower end and projecting downwardly beyond said lower chamber; means associated with said body member providing a fluid-tight housing and completely surrounding, but spaced from, the walls of the projecting end of said pipe, and venting means associated with one of said chambers.

5. The device described in claim 4 wherein said baffle member is integrally formed with said body member and is provided with an upper surface that is inclined downwardly toward said pipe.

6. The device described in claim 4, wherein said body member comprises two overlapping body-forming elements and said baffle member is integrally formed with one of said body-forming elements in the region where the latter cooperates with the other body-forming element.

7. A liquid seal for fluid pressure regulators or the like comprising a pair of hollow housings disposed in axial alignment and secured together in fluid-tight relation; a pipe disposed within said housing members and adapted to be connected to a source of pressure; means for dividing the interior of said housing members into two chambers and providing a baffle, comprising a reduced portion formed on one of said housing members and which terminates in spaced relation to the outer surface of said pipe to provide a constricted orifice therebetween.

ALLEN D. MacLEAN.
CHAS. B. JOHNSON.